US012738185B2

(12) United States Patent
Kwak et al.

(10) Patent No.: US 12,738,185 B2
(45) **Date of Patent: *Sep. 15, 2026**

(54) DISPLAY PANEL AND METHOD OF TESTING THE SAME

(71) Applicant: SAMSUNG DISPLAY CO., LTD., Yongin-si (KR)

(72) Inventors: Won-Kyu Kwak, Seongnam-si (KR); Hwan-Soo Jang, Asan-si (KR); Seung-Kyu Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 195 days.

This patent is subject to a terminal disclaimer.

(21) Appl. No.: 18/807,852

(22) Filed: Aug. 16, 2024

(65) Prior Publication Data

US 2024/0412671 A1 Dec. 12, 2024

Related U.S. Application Data

(63) Continuation of application No. 17/352,118, filed on Jun. 18, 2021, now Pat. No. 12,067,910, which is a (Continued)

(30) Foreign Application Priority Data

Mar. 4, 2015 (KR) ........................ 10-2015-0030282

(51) Int. Cl.
*G09G 3/00* (2006.01)
*G09G 3/3291* (2016.01)

(52) U.S. Cl.
CPC ........... *G09G 3/006* (2013.01); *G09G 3/3291* (2013.01); *G09G 2310/0291* (2013.01); *G09G 2310/0297* (2013.01)

(58) Field of Classification Search
CPC ................. G09G 3/006; G09G 3/3291; G09G 2310/0291; G09G 2310/0297
(Continued)

(56) References Cited

U.S. PATENT DOCUMENTS

| | | | |
|---|---|---|---|
| 7,518,602 | B2 | 4/2009 | Nozawa |
| 7,733,115 | B2 | 6/2010 | Chen et al. |

(Continued)

FOREIGN PATENT DOCUMENTS

| | | | |
|---|---|---|---|
| CN | 1801264 | A | 7/2006 |
| CN | 103927971 | A | 7/2014 |

(Continued)

OTHER PUBLICATIONS

Korean Notice of Allowance dated May 30, 2021, issued in corresponding Korean Patent Application No. 10-2015-0030282 (5 pages).

*Primary Examiner* — Alesa Allgood
*Assistant Examiner* — Rahul Maini
(74) *Attorney, Agent, or Firm* — Womble Bond Dickinson (US) LLP

(57) ABSTRACT

A display panel includes: a display including pixel columns electrically connected to data lines; a non-display area adjacent the display; a test circuit configured to receive a lighting test signal passing through at least a portion of the non-display area and to transfer the lighting test signal to the data lines in response to a test control signal; and a switch configured to receive a data signal from an external component and to transfer the data signal to the data lines in response to a switching signal.

10 Claims, 10 Drawing Sheets

Related U.S. Application Data continuation of application No. 16/525,243, filed on Jul. 29, 2019, now Pat. No. 11,087,654, which is a continuation of application No. 14/823,912, filed on Aug. 11, 2015, now Pat. No. 10,366,643.

(58) Field of Classification Search
USPC ...................................... 348/189; 324/750.01
See application file for complete search history.

(56) References Cited

U.S. PATENT DOCUMENTS

| | | | |
|---|---|---|---|
| 9,066,408 | B2 | 6/2015 | Choi et al. |
| 9,188,822 | B2 | 11/2015 | Kim et al. |
| 9,552,774 | B2 | 1/2017 | Jeong et al. |
| 9,595,213 | B2 | 3/2017 | Kim |
| 2009/0262048 | A1 | 10/2009 | Park et al. |
| 2009/0283774 | A1 | 11/2009 | Shin et al. |
| 2011/0080173 | A1 | 4/2011 | Kim et al. |
| 2011/0175800 | A1 | 7/2011 | Mizumaki |
| 2014/0176844 | A1 | 6/2014 | Yanagisawa |
| 2014/0240521 | A1 | 8/2014 | Kwak |
| 2014/0368228 | A1 | 12/2014 | Kim |
| 2016/0043010 | A1 | 2/2016 | Kwak et al. |
| 2016/0140896 | A1 | 5/2016 | Kwon et al. |
| 2016/0225312 | A1 | 8/2016 | Byun et al. |
| 2016/0232826 | A1 | 8/2016 | Cho |
| 2016/0247436 | A1 | 8/2016 | Lee et al. |
| 2016/0260367 | A1 | 9/2016 | Kwak et al. |
| 2016/0267826 | A1 | 9/2016 | Seo |
| 2016/0372017 | A1 | 12/2016 | Byun et al. |
| 2017/0069239 | A1 | 3/2017 | Kwon et al. |
| 2017/0237009 | A1 | 8/2017 | Kwak et al. |

FOREIGN PATENT DOCUMENTS

| | | | |
|---|---|---|---|
| CN | 104008721 | A | 8/2014 |
| KR | 10-2009-0090677 | A | 8/2009 |
| KR | 10-2009-0105027 | A | 10/2009 |
| KR | 10-2011-0008725 | A | 1/2011 |
| KR | 10-2011-0024450 | A | 3/2011 |
| KR | 10-2011-0037638 | A | 4/2011 |
| KR | 10-1166829 | B1 | 7/2012 |
| KR | 10-2014-0058710 | A | 5/2014 |
| KR | 10-2014-0094231 | A | 7/2014 |
| KR | 10-2014-0141375 | A | 12/2014 |

DISPLAY PANEL AND METHOD OF TESTING THE SAME

CROSS-REFERENCE TO RELATED APPLICATIONS

This application is a continuation of U.S. patent application Ser. No. 17/352,118, filed Jun. 18, 2021, which is a continuation of U.S. patent application Ser. No. 16/525,243, filed Jul. 29, 2019, now U.S. Pat. No. 11,087,654, which is a continuation of U.S. patent application Ser. No. 14/823,912, filed Aug. 11, 2015, now U.S. Pat. No. 10,366,643, which claims priority to and the benefit of Korean Patent Application No. 10-2015-0030282, filed on Mar. 4, 2015 in the Korean Intellectual Property Office (KIPO), the content of all of which is incorporated herein by reference in its entirety.

BACKGROUND

1. Field

Example embodiments of the present invention relate to a display device and/or a display panel and a method of testing the same.

2. Description of the Related Art

Generally, organic light emitting display devices include a display panel that displays an image, a scan driver that provides a scan signal to the display panel, a data driver that provides a data signal to the display panel, and an emission control driver that provides an emission control signal to the display panel.

Display panels are generally manufactured through a sophisticated semiconductor manufacturing process. During manufacturing, cracks (or, defects) may occur in various components, wiring, and the substrate during a manufacturing process steps such as an etching process, a cutting process, etc.

The cracks may result in problems such as panel driving failures, panel shrinkages, etc. For example, in the case of a foldable display panel or a rollable display panel, severe cracks due to external forces may occur (or, appear) as the display panel is folded/unfolded or rolled/unrolled.

A lighting test may be used to detect internal cracks (or, internal defects) of a display panel (e.g., to detect damages of wirings included in the display panel) during a manufacturing process of the display panel. However, the lighting test has limits to detect micro-cracks. In addition, the lighting test may be carried out before a driving integrated circuit is mounted in a display panel, so that the lighting test may not detect cracks that occur after the driving integrated circuit is mounted in the display panel.

SUMMARY

Example embodiments of the present invention relate to a display device. For example, embodiments of the present invention relate to a display panel that detects internal cracks (or, internal defects) and a method of testing the display panel.

Some example embodiments provide a display panel in which internal cracks (or, internal defects) can be detected while changes in the structure and/or process of manufacturing the display panel are minimized.

Some example embodiments provide a method of testing a display panel capable of detecting internal cracks of the display panel after a driving integrated circuit is mounted in the display panel as well as before the driving integrated circuit is mounted in the display panel.

According to example embodiments, a display panel includes: a display including pixel columns electrically connected to data lines; a non-display area adjacent the display; a test circuit configured to receive a lighting test signal passing through at least a portion of the non-display area and to transfer the lighting test signal to the data lines in response to a test control signal; and a switch configured to receive a data signal from an external component and to transfer the data signal to the data lines in response to a switching signal.

The display panel may further include a driving integrated circuit that may be configured to generate the test control signal and the switching signal and to supply a reference signal to the switch.

The driving integrated circuit may be configured to generate the test control signal and the switching signal to alternately supply the lighting test signal and the reference signal to the data lines.

The test circuit may include: a lighting test line extending through the portion of the non-display area and electrically connected to one pixel column at an outermost of the display via the data lines.

The display may include: a first pixel column in which a first pixel emitting a first color light and a second pixel emitting a second color light are alternately arranged; a second pixel column in which the first pixel and the second pixel are alternately arranged in reverse order of the first pixel column; and a third pixel column in which a third pixel emitting a third color light is arranged, wherein the lighting test line is electrically connected to the third pixel column.

The display may further include a fourth pixel column in which the third pixel is arranged, the fourth pixel column being electrically connected to the test circuit via a resistor of which a resistance is equal to a resistance of the lighting test line.

The test circuit may further include: a test transistor configured to electrically connect the lighting test line with the data lines in response to the test control signal.

The switch may include: a data distribution circuit configured to selectively supply the data signal to the pixel column.

The switch may include: a switching transistor configured to transfer the data signal to the data lines in response to the switching signal.

The switch may be implemented in a driving integrated circuit.

The display panel may further include: a pre-test circuit electrically connected to the switch in parallel and configured to supply a pre-lighting test signal to the data lines in response to a pre-test control signal.

The pre-test circuit may include a pre-lighting test line extending through the portion of the non-display area.

The data lines may be initialized by the lighting test signal during a first period, and the pre-lighting test signal may be written into the data lines during a second period that is different from the first period.

According to some example embodiments of the present invention, a display panel includes a display including pixel columns electrically connected to data lines; a non-display area adjacent the display; a first test circuit configured to receive a first lighting test signal passing through at least a portion of the non-display area and to transfer the first lighting test signal to the data lines in response to a first test control signal; a switch configured to receive a data signal from an external component and to transfer the data signal to the data lines in response to a switching signal; a second test circuit electrically connected to the switch in parallel and configured to supply a second lighting test signal to the data lines in response to a second test control signal; and a driving integrated circuit configured to generate the first test control signal, the second test control signal, and the switching signal.

The driving integrated circuit may be configured to control the second test circuit to be in an off state using the second lighting test signal, the driving integrated circuit may be configured to control the first test circuit to supply the first lighting test signal to the data lines during a first period using the first test control signal, and the driving integrated circuit may be configured to control the switch to supply a reference voltage to the data lines during a second period that is different from the first period using the switching signal.

The display panel may further include: a scan driver configured to control the pixel columns to receive the reference voltage from the data lines during the second period.

The second test circuit may include a second lighting test line extending through at least the portion of the non-display area.

According to some example embodiments of the present invention, in a method of testing a display panel, the display panel including a display including pixel columns electrically connected to data lines and a non-display area adjacent the display, the method includes: supplying a first lighting test signal passing through at least a portion of the non-display area to a first test circuit that transfers the first lighting test signal to the data lines; transferring a reference signal being supplied from a driving integrated circuit to the data lines using a switch; and transferring the first lighting test signal to the data lines using the first test circuit.

Supplying the first test circuit with the first lighting test signal may include: controlling a second test circuit to be in an off state, and the second test circuit may be electrically connected to the switch in parallel and supplies the data lines with a second lighting signal passing through at least the portion of the non-display area.

The transferring of the first lighting test signal may include: supplying a first test control signal to the first test circuit; and transferring the first lighting test signal to the data lines in response to the first test control signal.

Therefore, a display panel according to example embodiments may relatively easily detect internal cracks of the display panel while changes in the structure and/or process of manufacturing the display panel are minimized or reduced by including a lighting test line arranged in an outer area of the display panel, where a lighting state of the display panel is changed in response to a resistance variation of the lighting test line.

In addition, a method of testing the display panel according to example embodiments may detect internal cracks of the display panel after a driving integrated circuit is mounted in the display panel as well as before the driving integrated circuit is mounted in the display panel by supplying the display panel with a lighting test signal using a test circuit part and a switching part.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
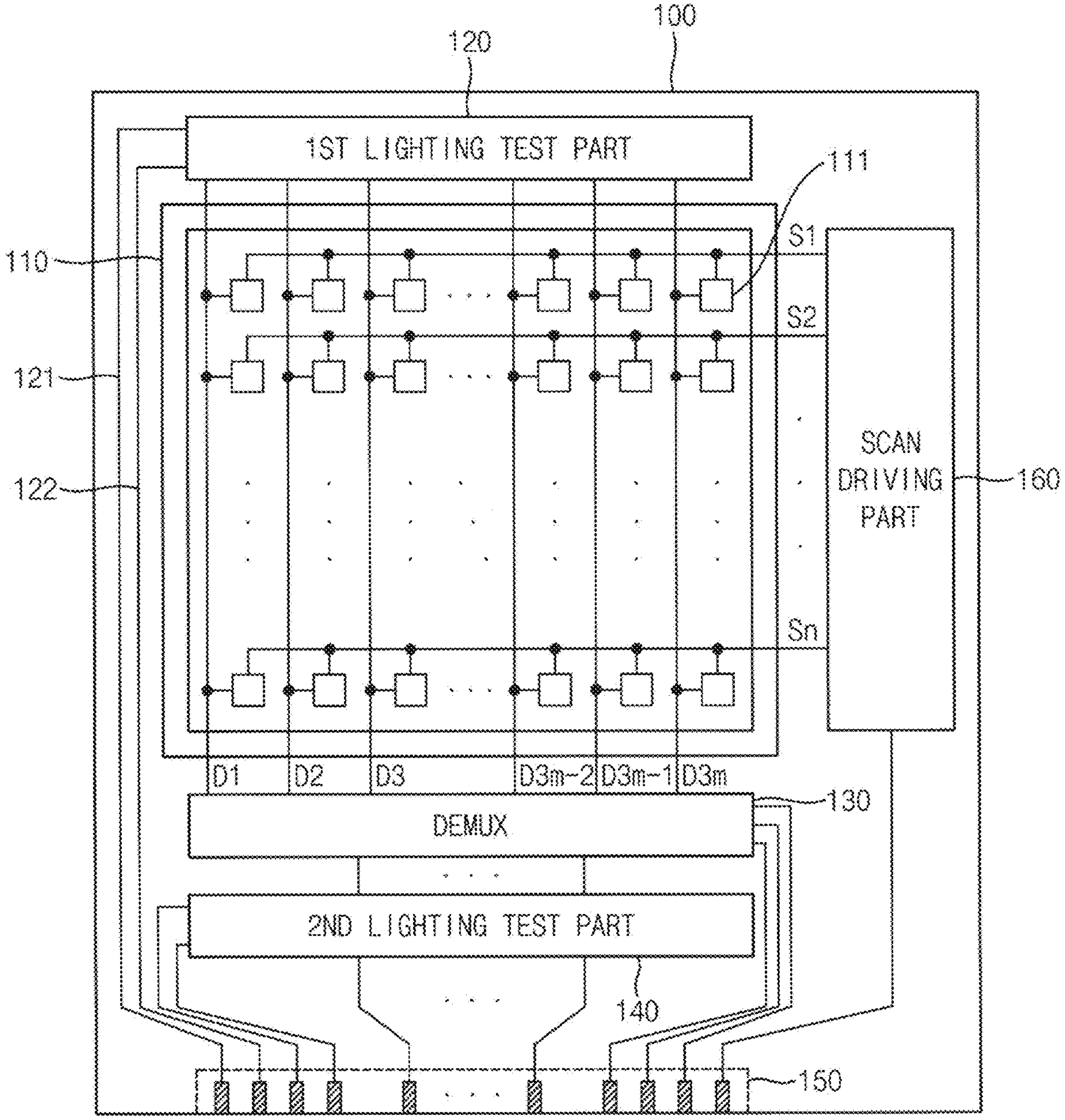
FIG. 1 is a block diagram illustrating a display panel in accordance with example embodiments.

Hereinafter, aspects of example embodiments of the present invention will be explained in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Generally, a lighting test refers to a method of detecting defective pixels, circuit damages, etc., in a display panel before a driving integrated circuit is mounted in the display panel. However, a lighting test according to example embodiments includes a module crack detection (MCD) test for detecting cracks in a non-display part of the display panel after the driving integrated circuit is mounted in the display part.

FIG. 1 is a block diagram illustrating a display panel in accordance with example embodiments.

Referring to FIG. 1, the display panel 100 may include a display part (or display) 110, a first test circuit part (or first test circuit) 120, a switching part (or switch) 130, a second test circuit part (or second text circuit) 140, a pad part (or pad) 150 and a scan driving part (or scan driver) 160. According to some example embodiments, the display panel 100 may be an organic light emitting diode display panel.

The display part 110 may include scan lines S1, S2, and Sn, data lines D1, D2, D3, D3*m*-2, D3*m*-1, and D3*m*, and pixels 111. The pixels 111 may be arranged at or in intersections of the scan lines S1, S2, and Sn and the data lines D1, D2, D3, D3*m*-2, D3*m*-1, and D3*m*. When a scan signal is supplied via the scan lines S1, S2 and Sn, the pixels 111 may store data signals supplied via the data lines D1, D2, D3, D3*m*-2, D3*m*-1, and D3*m* and may emit lights based on the data signals.

The display part 110 may include pixel columns that are arranged in parallel to the data lines D1, D2, D3, D3*m*-2, D3*m*-1, and D3*m*.

An area of the display panel 100 except (e.g., outside the footprint of) the display part 110 may be a non-display part (or non-display area). The non-display part may be a space arranged adjacent to the display part 110. In example, the non-display part may be a space in which the first circuit part (or circuit) 120 is arranged.

The first test circuit part 120 may transfer a lighting test signal to the data lines D1, D2, D3, D3*m*-2, D3*m*-1, and D3*m* in response to a first test control signal. Here, the first test control signal may be a signal to control the first test circuit part 120, and the lighting test signal may be a test voltage for a lighting test. The first test circuit part 120 may be electrically connected between the data lines D1, D2, D3, D3*m*-2, D3*m*-1, and D3*m* and the pad part 150. The first test circuit part 120 may transfer the first lighting test signal to the data lines D1, D2, D3, D3*m*-2, D3*m*-1, and D3*m* in response to the first test control signal. Here, the first light test signal may be transferred via a first lighting test line 121 and the first test control signal may be transferred via a first test control line 122.

In some example embodiments, the first test circuit part 120 may include a first lighting test line electrically connected to a pixel column which is arranged in an outermost area (or outside the periphery or footprint) of the display part 110. Here, the first lighting test line may be positioned through at least a portion of the non-display part. The first lighting test line will be described in more detail with reference to FIG. 2.

The switching part 130 may transfer a data signal applied from an external component to the data lines D1, D2, D3, D3*m*-2, D3*m*-1, and D3*m* in response to a switching signal. The switching part 130 may be electrically connected between the second test circuit part 140 and the data lines D1, D2, D3, D3*m*-2, D3*m*-1, and D3*m*. The switching part 130 may transfer the data signal (or, a second lighting test signal) provided from the second test circuit part 140 (or, the pad part 150) to the data lines D1, D2, D3, D3*m*-2, D3*m*-1, and D3*m*. For example, the switching part 130 may be a data distribution circuit (e.g., a demultiplexer) that selectively supplies the data signal to the pixel columns.

The second test circuit part 140 may transfer a second lighting test signal to the data lines D1, D2, D3, D3*m*-2, D3*m*-1, and D3*m* in response to a second test control signal. The second test circuit part 140 may be electrically connected between the switching part 130 and the pad part 150. The second test circuit part 140 may transfer the second test control signal to the switching part 130 in response to a second test control signal.

Further, after a driving integrated circuit is mounted in the display panel 100, the second test circuit part 140 may be turned off by a bias signal provided from the pad part 150. Because the second test circuit part 140 is used only before the driving integrated circuit is mounted in the display panel 100, the second test circuit part 140 may be referred to as a pre-test circuit part (or pre-test circuit). Likewise, a second lighting test signal and a second test control signal may be referred to as a pre-lighting test signal and a pre-test control signal, respectively.

The pad part 150 may include a plurality of pads P to transfer various driving powers and various driving signals applied from an external component to the display panel 100.

The scan driving part 160 may generate a scan signal in response to a scan driving control signal and may sequentially supply the scan signal to the scan lines. Here, the scan driving control signal may include a start pulse and a clock signal, and the scan driving part 160 may include a shift register that sequentially generates the scan signal in response to the start signal and the clock signal.

A configuration of a display panel 100 for a lighting test under a condition in which a driving integrated circuit is not mounted in the display panel 100 will described in more detail with reference to FIGS. 2 and 3. A configuration of a display panel 100 for a lighting test under a condition in which a driving integrated circuit is mounted in the display panel 100 will be described in more detail with reference to FIGS. 4A through 5.

Figure 2:
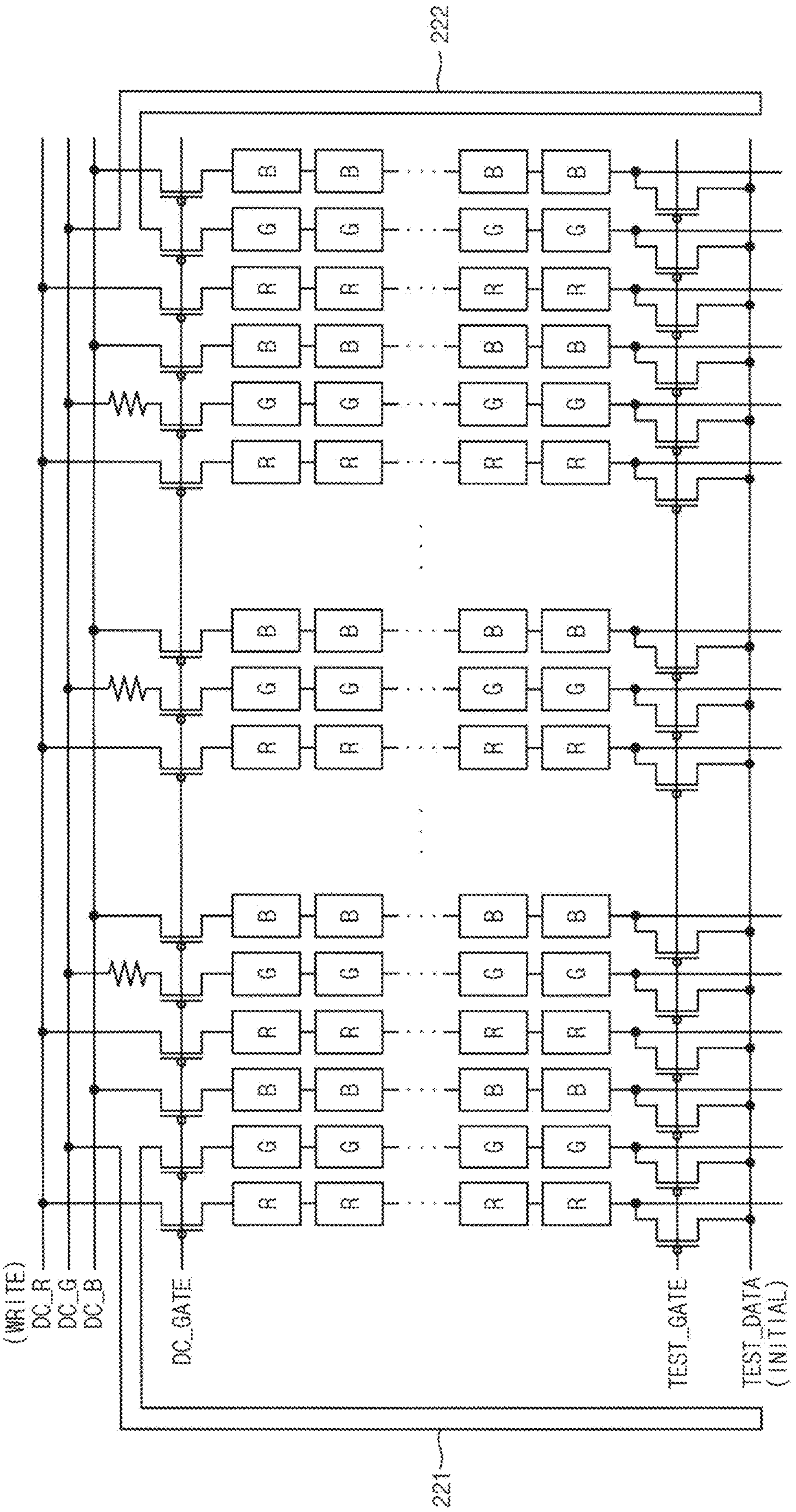
FIG. 2 is a circuit diagram illustrating an example of the display panel of FIG. 1.

FIG. 2 is a circuit diagram illustrating an example of the display panel of FIG. 1.

Referring to FIGS. 1 and 2, the display panel 100 may include a display part 100, a first test circuit part 120, and a second test circuit part 140.

The display part 110 may include a first pixel column, a second pixel column, and a third pixel column. The first pixel column may include a first pixel R emitting a red color light. The second pixel column may include a second pixel G emitting a green color light. The third pixel column may include a third pixel B emitting a blue color light. Generally, a sub-pixel may display one selected from a red color, a green color, and a blue color, and a pixel may include a plurality of sub-pixels. However, the first pixel, the second pixel, and the third pixel may be the sub-pixel or the pixel.

Although it is illustrated in FIG. 2 that the display part 110 includes the first pixel column, the second pixel column, and the third pixel column that are sequentially arranged along a right direction, the display part 110 is not limited thereto. For example, the display part 110 may include the first pixel column, the third pixel column, and the second pixel column that are sequentially arranged along the right direction. For example, the display part 110 may include pixels that are arranged in a Pentile matrix. The pixels arranged in the Pentile matrix will be described in more detail with reference to FIG. 4A.

The first test circuit part 120 may connect power supply wirings to the data lines in response to a first test control signal. The first test circuit part 120 may include a first transistor, a second transistor, a third transistor, and a first test control line. The first transistor may be connected between the first pixel column and a first wiring that transfers a first voltage DC_R. The second transistor may be connected between the second pixel column and a second wiring that transfers a second voltage DC_G. The third transistor may be connected between the third pixel column and a third wiring that transfers a third voltage DC_B. The first test control line may transfer a test control signal DC_GATE to turn on the first through third transistors.

Each of the first through third transistors is shown as a p-channel metal-oxide-semiconductor (PMOS) transistor in FIG. 2. However, the transistors are not limited thereto. For example, each of the first through third transistors may be an n-channel metal-oxide-semiconductor (NMOS) transistor. For example, types of at least two of the first through third transistors may be different from each other.

In an example embodiment, the first test circuit part 120 may include a lighting test line that is electrically connected to a pixel column arranged on an outermost of the display part 110. Here, the lighting test line may extend through (or be positioned at) at least a portion of the non-display part.

As shown in FIG. 2, the first test circuit part 120 may include a first lighting test line 221 and a second lighting test line 222. The first lighting test line 221 may be electrically connected between the second wiring and the second transistor positioned on a left side of the display part 110. Here, the first lighting test line 221 may extend through (or be positioned at) at least a portion of the non-display part. The first lighting test line 221 may have resistance, and the resistance of the first lighting test line 221 may be changed by a crack (i.e., damage) that occurs in the portion. Therefore, the display panel 100 may detect the damage in the display panel 100 (for example, the non-display part) based on a variation of the resistance of the first lighting test line.

Likewise, the second lighting test line 222 may be electrically connected between the second wiring and the second transistor arranged on a right side of the display part 110. Here, the second lighting test line 222 may extend through (or be positioned at) a right portion of the non-display part.

In FIG. 2, the lighting test lines 221 and 222 are shown as being electrically connected to a second pixel column (e.g., G pixel column). However, the lighting test lines 221 and 222 are not limited thereto. For example, the lighting test lines 221 and 222 may be electrically connected to a first pixel column (e.g., R pixel column) or a third pixel column (e.g., B pixel column). For example, the lighting test lines 221 and 222 may be electrically connected to different pixel columns.

In an example embodiment, a lighting test line may be electrically connected to a green pixel column arranged in an outermost of the display part 110. Each of a red pixel R, a green pixel G, and a blue pixel B may have different light-emitting characteristics, and luminance of the green pixel G may be higher than those of the red pixel R and the blue pixel B. Therefore, the first lighting test line 221 may be electrically connected to a second pixel column in which the green pixel G is arranged such that internal damage of the display panel may be detected more easily using visibility of the green pixel G.

In an example embodiment, the display part 110 may include a green pixel column that is electrically connected to the first test circuit part 120 via a resistor of which resistance is equal to that of the lighting test line. That is, a green pixel column that is not connected to the lighting test line may be electrically connected to the second wiring via a resistor. Here, resistance of the resistor may be equal to that of the lighting test line.

The second test circuit part 140 may include a fourth transistor that transfers a second lighting test signal TEST_DATA to the data lines in response to a second test control signal TEST_GATE.

As described above, the display device 100 may include a lighting test line extending through (or positioned at) at least a portion of the non-display part, and, the resistance of the lighting test line may be changed by a crack (i.e., damage) that occurs in the non-display part. Therefore, the damage may be detected based on a lighting state of a pixel column that is electrically connected to the lighting test line.

Figure 3:
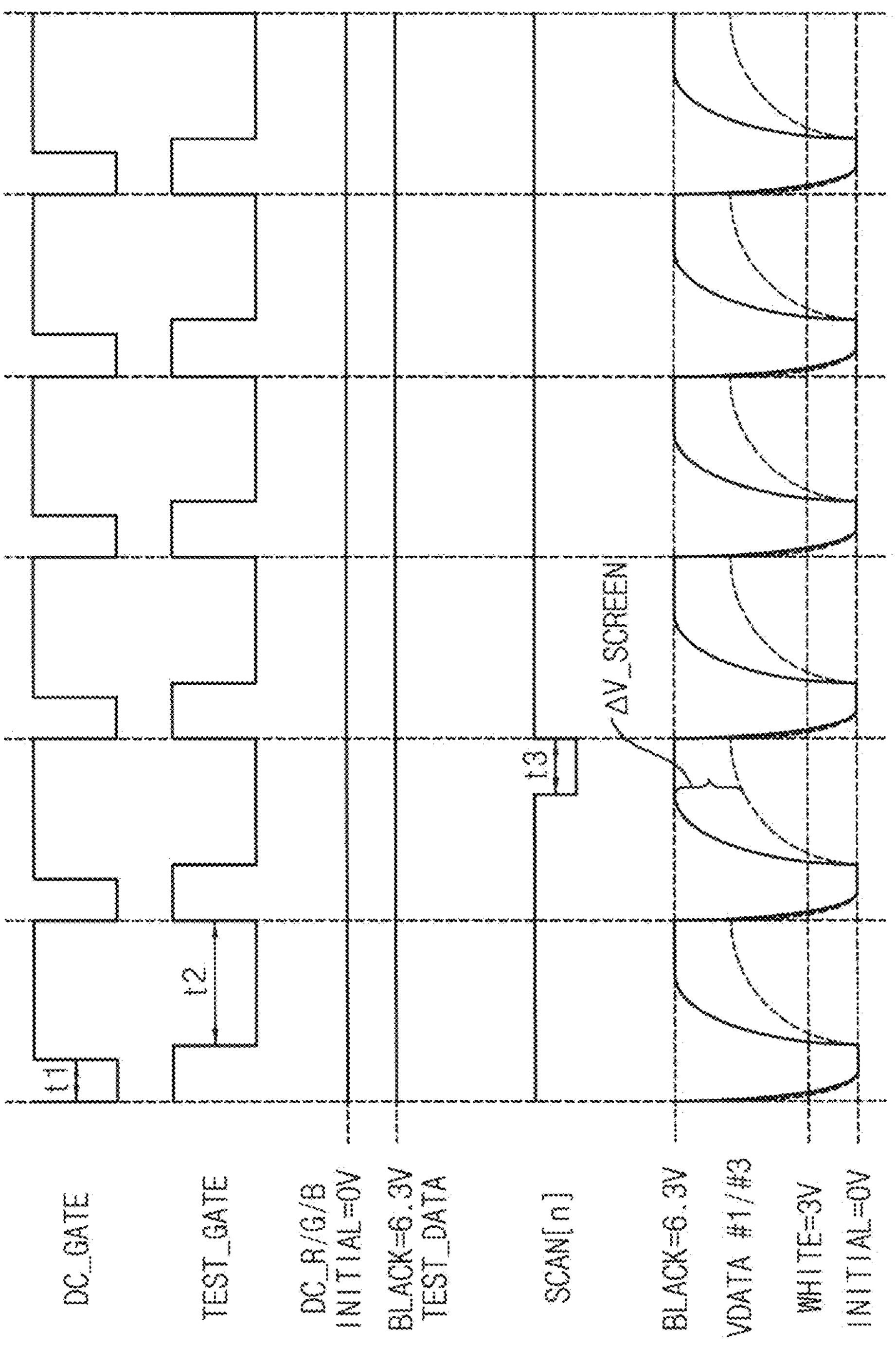
FIG. 3 is a waveform diagram illustrating a lighting test result of the display panel of FIG. 2.

FIG. 3 is a waveform diagram illustrating a lighting test result of the display panel of FIG. 2. In FIG. 3, it is assumed that a crack occurs in a right non-display part (i.e., an area in which a second lighting test line 222 is positioned) of the display panel 100 of FIG. 2.

Referring to FIGS. 2 and 3, each of the first lighting test signal DC_R/G/B, the first test control signal DC_GATE, the second test control signal TEST_GATE, the second lighting test signal TEST_DATA, and the scan signal SCAN [n], where n is a positive integer, may be a signal supplied to the display panel 100 for a lighting test.

The first lighting test signal DC_R/G/B may have 0V. The first lighting test signal DC_R/G/B may be at least one selected from the first through third voltages DC_R, DC_G, and DC_B shown in FIG. 2. The second lighting test signal TEST_DATA may have 6.3V (DC). Alternatively, the first lighting test signal DC_R/G/B and the second lighting test signal TEST_DATA may have different voltages in accordance with a lighting test condition. For example, the first lighting test signal DC_R/G/B may have 3V, and the second lighting test signal TEST_DATA may have 6V.

The first test control signal DC_GATE may have a low level during a first period t1 and may have a high level during other periods. Therefore, the first test circuit part 120 may transfer the first lighting test signal DC_R/G/B to the data lines during the first period t1 in response to the first control signal DC_GATE. For example, the first through third transistors in the first test circuit part 120 may be turned on during the first period t1 in response to the first control signal DC_GATE, such that the first through third wirings may be electrically connected to the data lines, respectively. Therefore, the first test circuit part 120 may initialize the data lines during the first period t1.

A second test control signal TEST_GATE may have a low level during a second period t2 and may have a high level during other periods. Therefore, the second test circuit part 140 may transfer the second lighting test signal TEST_DATA to the data lines during the second period t2 in response to the second control signal TEST_GATE.

Here, the first period t1 may be different from the second period t2. That is, the first period t1 and the second period t2 may not overlap each other. The first period t1 and the second period t2 may be set based on the number of pixel columns, the number of scan lines, a speed of data storage, etc.

As described above, the display panel 100 may initialize a data signal written into the data lines in response to the first lighting test signal DC_R/G/B during the first period t1 and may write the second lighting test signal TEST_DATA into the data lines during the second period t2 that is different from the first period t1.

A scan signal SCAN[n] may be a scan signal supplied to an (n)th scan line, and the scan signal SCAN[n] may have a high level during a third period t3. Pixels may emit a light based on the data signal written into the data lines in response to the scan signal SCAN[n].

Measured signals VDATA #1 and VDATA #3 may be signals measured on data lines electrically connected to the first lighting test line 221 and the second lighting test line 222, respectively.

A first measured signal VDATA #1 may be initialized during the first period t1 by the first test circuit part 120. The first measured signal VDATA #1 may maintain an initial state until the second period t2 starts. The first measured signal VDATA #1 may be raised toward the second lighting test signal (e.g., 6.3V) from a start point of the second period t2. The first measured signal VDATA #1 may maintain 6.3V until the second period t2 is over. Here, the first measured signal VDATA #1 may have a parabolic shape according to a data line delay effect.

The second measured signal VDATA #3 may be initialized during the first period t1 by the first test circuit part 120. The second measured signal VDATA #3 may maintain an initial state until the second period t2 starts. The second measured signal VDATA #3 may be raised. However, the second measured signal VDATA #3 may be lower than the second lighting test signal (e.g., 6.3V). Because increased resistance of the second lighting test line 222 due to a crack that occurs in a non-display part increases the data line delay effect in accordance with the second lighting test line, the second measured signal VDATA #3 may not reach a target data voltage 6.3V until the second period t2 is over.

Therefore, the second measured signal VDATA #3 may have a voltage difference ΔV_SCREEN with the first measured signal VDATA #1 at a point that a data signal is supplied to a pixel (or, at a start point of t3). A pixel column electrically connected to the second lighting test ling 222 may emit color light different from that of another pixel column electrically connected to the first lighting test ling 221.

As described above, because increased resistance of a lighting test line may increase the data line delay effect and pixel columns electrically connected to the lighting test line may emit a color light different from that of other pixel columns in accordance with the increased data line delay effect. Therefore, the display panel may enable detecting internal cracks of the display panel 100 based on a lighting state of a pixel column that is electrically connected to the lighting test line.

Figure 4A:
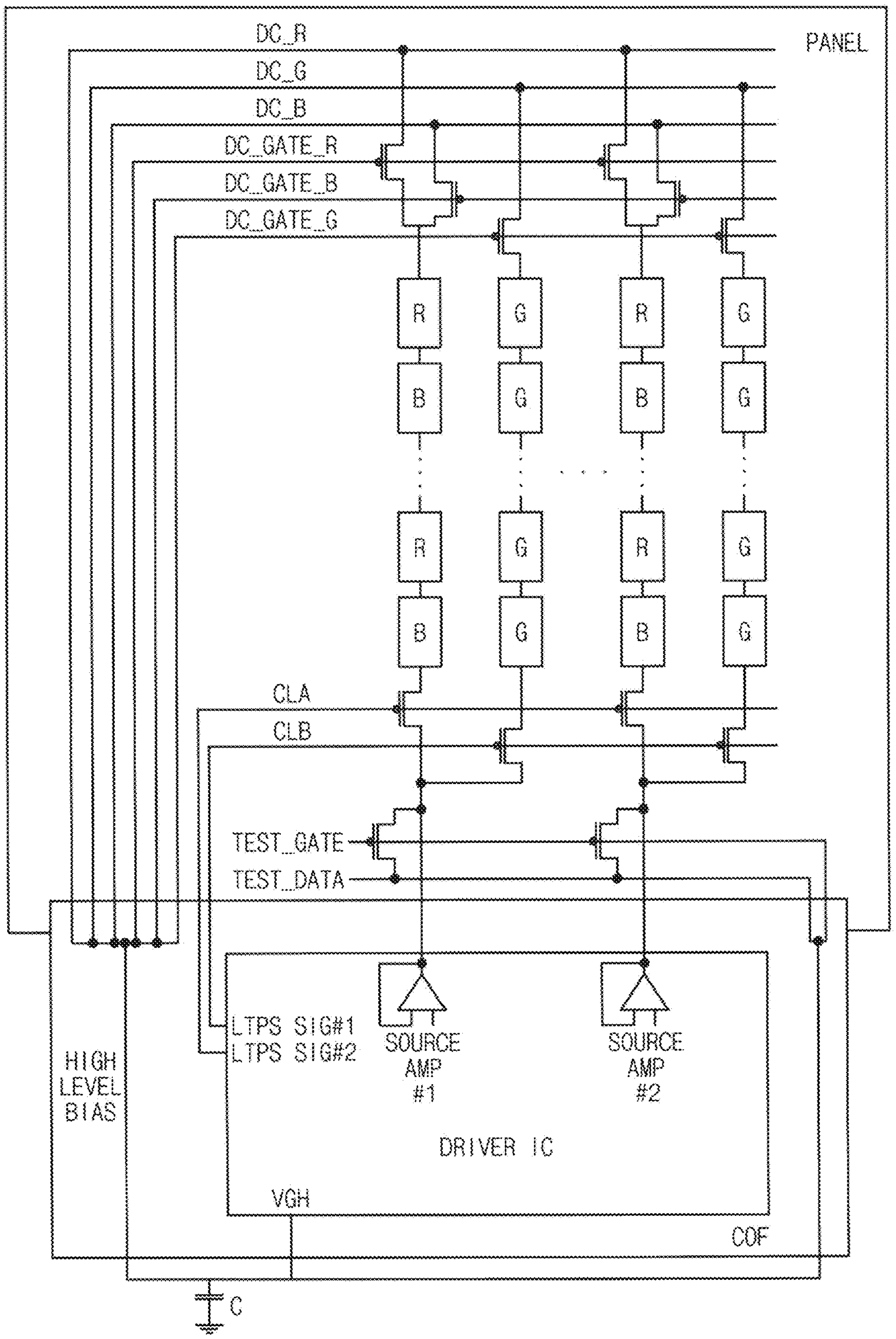
FIG. 4A is a circuit diagram illustrating an example of the display panel of FIG. 1.
Figure 4B:
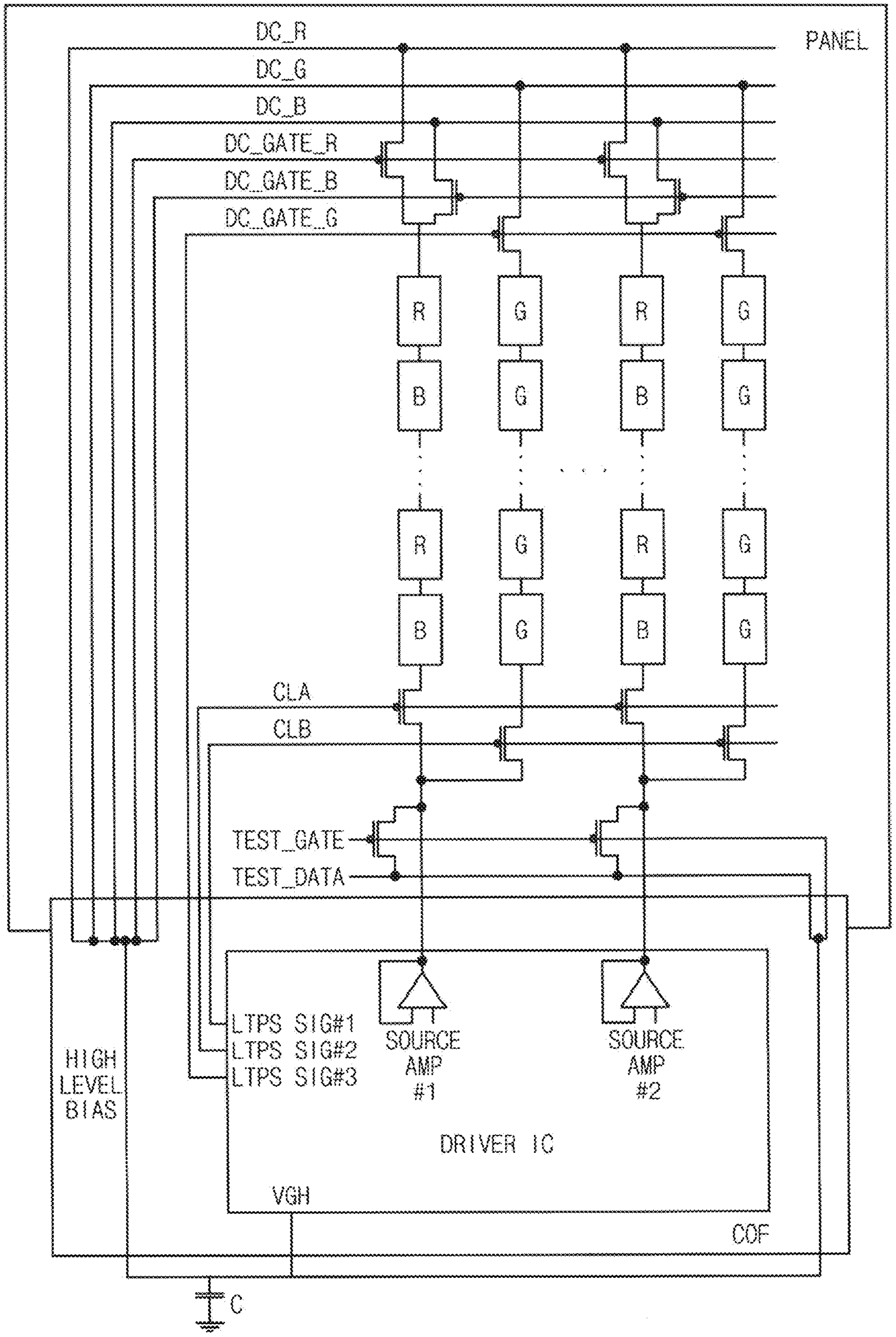
FIG. 4B is a circuit diagrams illustrating an example of the display panel of FIG. 1.

FIG. 4A is a circuit diagram illustrating an example of the display panel of FIG. 1 and FIG. 4B is a circuit diagram illustrating an example of the display panel of FIG. 1.

Referring to FIGS. 1, 4A and 4B, a display panel 100 may include a display part 110, a first test circuit part 120, a switching part 130, a second test circuit part 140, and a driving integrated circuit.

The display part 110 may include pixel columns arranged in a Pentile matrix. The display part 110 may include a fourth pixel column, a fifth pixel column, and a sixth pixel column. The fourth pixel column may include a first pixel R and a second pixel G that are alternately arranged. The fifth pixel column may include the first pixel R and the second pixel B that are alternately arranged in reverse order of the fourth pixel column. The sixth pixel column may include a third pixel G.

The first test circuit part 120 may be substantially similar to or the same to a first test circuit part described with reference to FIG. 2. However, the first test circuit part 120 shown in FIG. 4A may selectively supply a first voltage DC_R and a third voltage DC_B to the fourth pixel column (i.e., a pixel column in which the first pixel R and the third pixel B are alternately arranged) according to the Pentile matrix. The first test circuit part 120 may include three sub-test control lines to transfer first test control signals DC_GATE_R, DC_GATE_G, and DC_GATE_B.

Referring to FIG. 4A, the first through third voltages DC_R, DC_G, and DC_B (or, first lighting test signals), and first test control signals DC_GATE_R, DC_GATE_G, and DC_GATE_B may be biased by a high level signal (e.g., a voltage charged in C) applied from an external component. Therefore, the first test circuit part 120 may be turned off.

The second test circuit part 140 may be substantially similar to or the same to a second test circuit part 140 described with reference to FIG. 2. A second lighting test signal TEST_DATA and a second test control signal TEST_GATE may be biased by a high level signal. Therefore, the second test circuit part 140 may be turned off.

The switching part 130 may selectively transfer a signal supplied from the driving integrated circuit (or, the second test circuit part) to the data lines in response to switching signals CLA and CLB supplied from the driving integrated circuit.

The driving integrated circuit may provide the switching part 130 with a data signal and switching signals CLA and CLB. The driving integrated circuit may be mounted as a chip on flexible printed circuit (COF) in the display panel 100.

When a second lighting test signal TEST_DATA is supplied to the data lines by the second test circuit part 140 for lighting test of the display panel 100 of FIG. 4A, the second lighting test signal TEST_DATA may conflict with a data signal supplied from the driving integrated circuit. Therefore, a lighting test of the display panel of FIG. 4A is impossible.

Referring to FIG. 4B, a display panel 100 may be the same to or substantially similar to a display panel 100 of FIG. 4A, except a third terminal LTPS SIG #3 of the driving integrated circuit.

The third terminal LTPS SIG #3 may output a third sub-test control signal DC_GATE_G and may be electrically connected to a second pixel column (e.g., G pixel column) via a third sub-lighting test line. The first test circuit part 120 may supply a third voltage DC_G to the second pixel column (e.g., G pixel column) in response to the third sub-test control signal DC_GATE_G.

The display panel 100 of FIG. 4B may have a wring to be supplied a first test control signal from the driving integrated circuit such that the display panel 100 may generate a lighting test signal using the first test circuit part 120 and the switching part 130. Whereas display panels shown in FIG. 2 and FIG. 4A may generate a lighting test signal using the first test circuit part 120 and the second test circuit part 140, the display panel of FIG. 4B may generate a lighting test signal using the first test circuit part 120 and the switching part 130. Therefore, a lighting test of the display panel 100 of FIG. 4B in which the driving integrated circuit is mounted may be possible.

Further, a lighting test may be carried out using the first pixel column (i.e., a pixel column in which the first pixel R and the third pixel B are alternately arranged) arranged in left side of a display part 110. However, considering an influence of AC characteristics of the first pixel column (or, a signal supplied to the first pixel column), the lighting test may be carried out with the second pixel column (e.g., green pixel column) in which one type of pixel is arranged.

Hereinafter, a method of testing a display panel of FIG. 4B performing a lighting test (or a module crack detection test) would be described with reference to FIG. 5.

Figure 5:
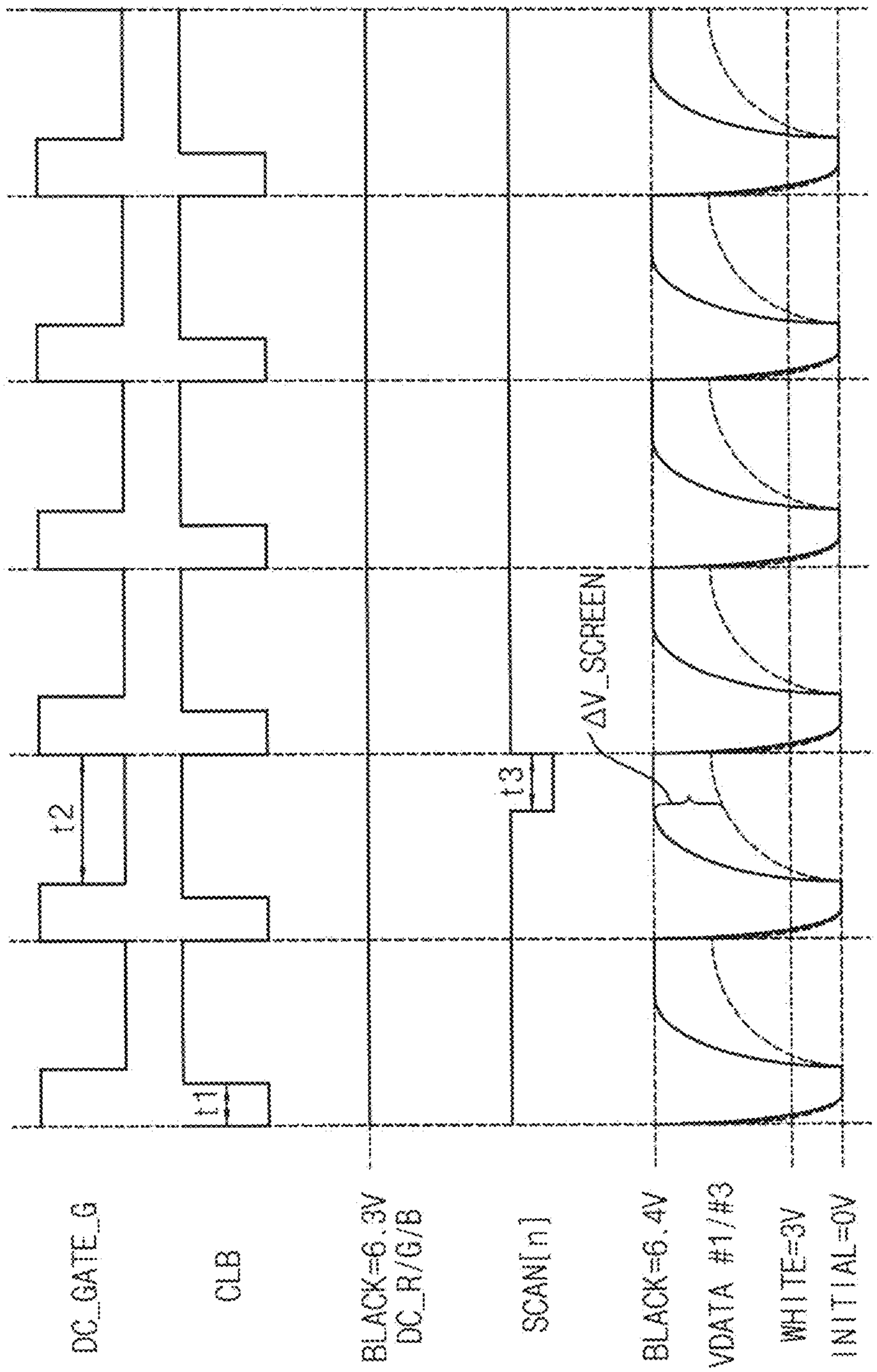
FIG. 5 is a waveform diagram illustrating a lighting test result of the display panel of FIG. 4B.

FIG. 5 is a waveform diagram illustrating a lighting test result of the display panel of FIG. 4B. In FIG. 5, it is assumed that a crack occurs in a right non-display part of the display panel 100 of FIG. 4B.

Referring to FIGS. 4B and 5, a first lighting test signal DC_R/G/B may have 0V. The first lighting test signal DC_R/G/B may be at least one selected from the first through third voltage DC_R, DC_G and DC_B shown in FIG. 4B. Although not shown in FIG. 4B, a reference signal supplied to the switching part 130 from the driving integrated circuit may have 0V. The reference signal may be used as a second lighting test signal.

A switching control signal CLB may have a low level during a first period t1, and may have a high level during other periods. Therefore, the switching part 130 may transfer the reference signal to the data lines during the first period t1 in response to the switching control signal CLB. For example, a switching transistor in the switching part may be turned on during the first period t1 in response to the switching control signal such that an output terminal of a source amplifier in the driving integrated circuit may be electrically connected to the data lines. Therefore, the switching part 130 may initialize a data signal written into the data lines during the first period t1.

A third sub-test control signal DC_GATE_G (or, a first test control signal) may have a low level during a second period t2, and may have a high level during other periods. Therefore, the first test circuit part 120 may transfer the sub-test control signal DC_G (or, the first lighting test signal) to the data lines in the second period t2 in response to the third sub-test control signal DC_GATE_G (or, a first test control signal).

A scan signal SCAN[n], where n is a positive integer, may have a high level during a third period t3. Pixels may emit a light based on the data signal written into the data lines in response to the scan signal SCAN[n].

A first measured signal VDATA #1 may be a signal which is measured at a data line electrically connected to a lighting test line extending through (or positioned at) a non-display part in which no crack (i.e., no damage) occurs. A second measured signal VDATA #3 may be a signal which is measured at a data line electrically connected to a lighting test line extending through (or positioned at) a non-display part in which a crack (i.e., damage) occurs.

Similarly to measured signals VDATA #1 and VDATA #3 described with reference to FIG. 3, the first measured signal VDATA #1 may be charged in 6.4V during the second period t2. The second measured signal VDATA #3 may be raised at a start point of the second period t2, but the second measured signal VDATA #3 may not reach a target data voltage 6.4V until the second period is over due to an increased data line delay effect. Therefore, the second measured signal VDATA #3 may have a voltage difference ΔV_SCREEN with the first measured signal VDATA #1 at a point that a data signal is supplied to a pixel (i.e., a start point of t3).

As described above, a method of testing a display panel 100 may supply the data lines with a first lighting test signal and a reference signal using the first test circuit part 120 and the switching part 130. Therefore, a lighting test of a display panel 100 in which the driving integrated circuit is mounted may be possible.

As described with reference to FIGS. 2 to 5, the display panel 100 according to example embodiments may be enable to carry out a lighting test not only under a condition in which the driving integrated circuit is not mounted in the display panel 100 but also under a condition in which the driving integrated circuit is mounted in the display panel 100. For example, the display panel 100 in which the driving integrated circuit is mounted may enable to carry out lighting test using the first test circuit part 120 and the switching part 130. Therefore, the display panel 100 according to example embodiments may enable cracks in the display panel to be detected not only under a condition in which the driving integrated circuit is not mounted but also under a condition in which the driving integrated circuit is mounted.

Figure 6:
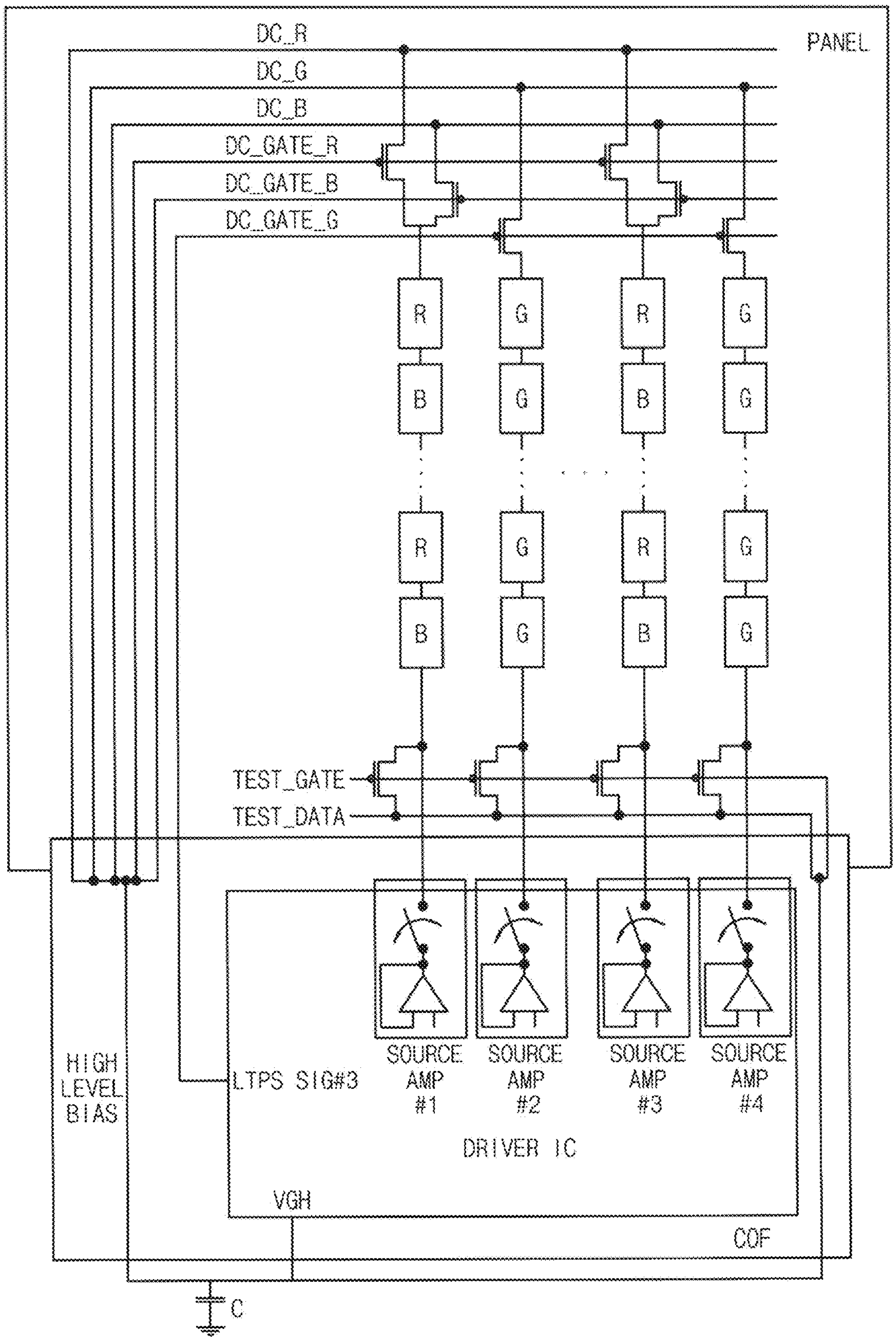
FIG. 6 is a circuit diagram illustrating an example of the display panel of FIG. 1.

FIG. 6 is a circuit diagram illustrating an example of the display panel of FIG. 1.

Referring to FIGS. 1 and 6, a display panel 100 may include a display part 100, a first test circuit part 120, a second test circuit part 140, and a driving integrated circuit.

The display panel 100 may be the same to or substantially similar to a display panel of FIG. 4B. However, the display panel of FIG. 6 may not include a switching part 130.

Referring to FIG. 6, the driving integrated circuit may have a switching function substantially similar to the switching part shown in FIG. 4B. For example, the driving integrated circuit may perform a switching operation by changing impedances of output terminals of source amplifiers SOURCE AMP #1, SOURCE AMP #2, SOURCE AMP #3, and SOURCE AMP #4. That is, the driving integrated circuit may electrically be disconnected to the data lines in response to a high impedance state (i.e., Hi-Z) of the output terminals of source amplifiers SOURCE AMP #1, SOURCE AMP #2, SOURCE AMP #3, and SOURCE AMP #4.

For example, the driving integrated circuit may include additional switches in the output terminals of source amplifiers SOURCE AMP #1, SOURCE AMP #2, SOURCE AMP #3, and SOURCE AMP #4.

As described above, even though a display panel 100 may not include a switching part, the display panel 100 may be enable to be performed a lighting test using a switching function of a driving integrated circuit under a condition in which the driving integrated circuit is mounted.

Hereinafter, a method of testing a display panel 100 of FIG. 6 performing a lighting testing (or, a module crack detection test) may be described with reference to FIG. 7.

Figure 7:
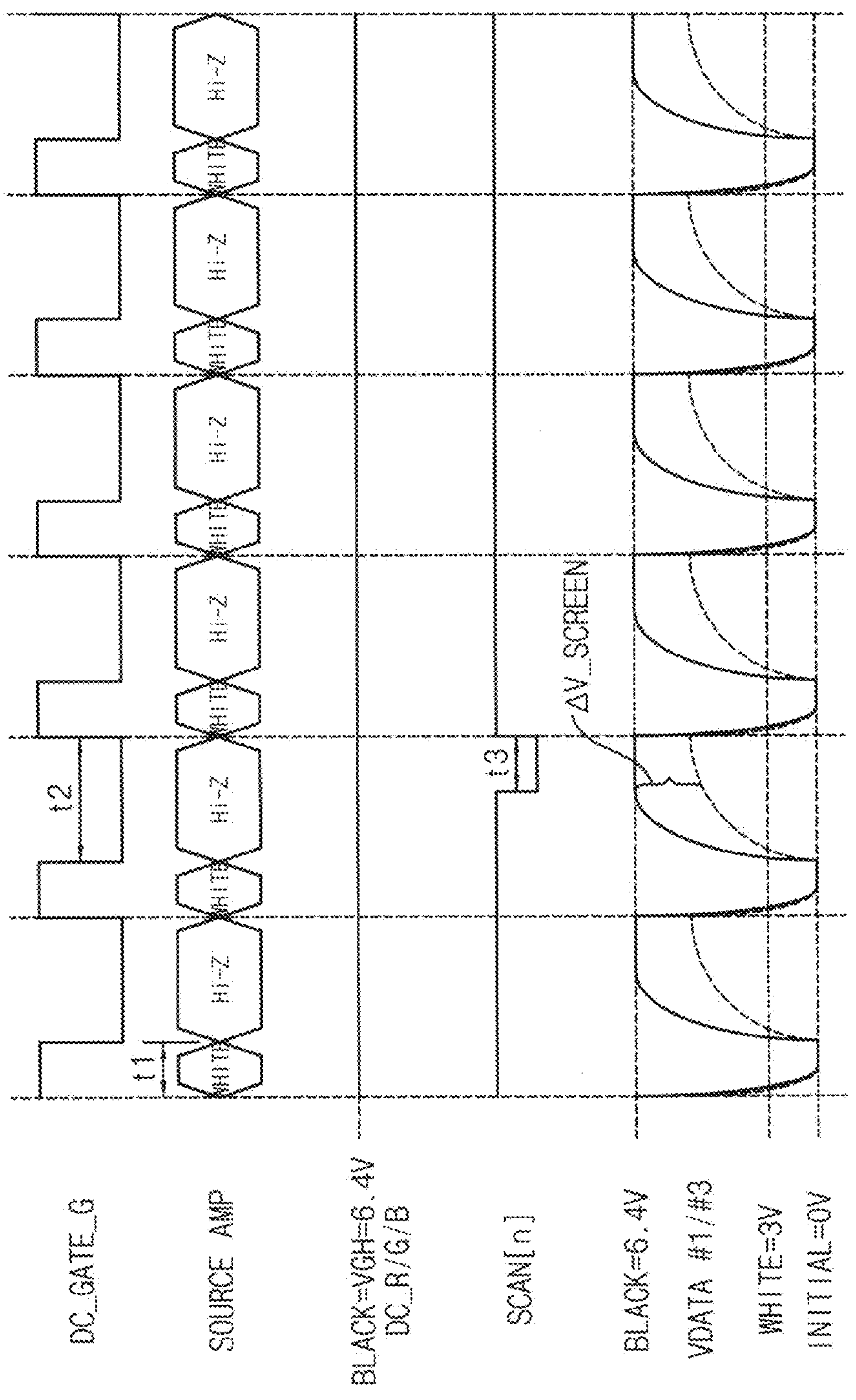
FIG. 7 is a waveform diagram illustrating a lighting test result of the display panel of FIG. 6.

FIG. 7 is a waveform diagram illustrating a lighting test result of the display panel of FIG. 6. In FIG. 7, it is assumed that a crack occurs in a right non-display part of the display panel of FIG. 6.

Referring to FIG. 7, a first lighting test signal DC_R/G/B, a third sub test control signal DC_GATE_G (or a first test control signal), and a scan signal SCAN[n] may be substantially the same as those shown in FIG. 5. Because the first lighting test signal DC_R/G/B, the third sub test control signal DC_GATE_G, and the scan signal SCAN[n] are described with reference to FIG. 5, some duplicated description will not be repeated.

Output impedance SOURCE AMP of a source amplifier may be low (e.g., White) during a first period t1 and may be high (e.g., Hi-Z) during other periods. According to the impedance SOURCE AMP of the source amplifier, the driving integrated circuit may transfer a reference signal to the data lines during the first period t1. Therefore, the driving integrated circuit may initialize a data signal written into the data lines during the first period t1 using a variation of the output impedance.

As described above, a first measured signal VDATA #1 may be a signal which is measured at a data line electrically connected to a lighting test line extending through (or positioned at) a non-display part in which no crack (i.e., no damage) occurs. A second measured signal VDATA #3 may be a signal which is measured at a data line electrically connected to a lighting test line extending through (or positioned at) a non-display part in which a crack (i.e., damage) occurs.

The first measured signal VDATA #1 may be increased toward 6.4V during the second period t2. The second measured signal VDATA #3 may be raised at a start point of the second period t2. However, the second measured signal VDATA #3 may not reach a target voltage of 6.4V until the second period is over due to an increased data line delay. Therefore, the second measured signal VDATA #3 may have a voltage difference ΔV_SCREEN with the first measured signal VDATA #1 at a point that a data is supplied to a pixel (or, a start point of t3).

As described above, when a display panel may not include a switching part (e.g., a demultiplexer), a method of testing a display panel may use controlling an output impedance of a driving integrated circuit such that a first lighting test signal and a reference signal may be supplied to data lines. Therefore, the method may perform a lighting test of a display panel in which the driving integrated circuit is mounted (e.g., a display module).

Similarly, a method of testing a display panel may selectively supply the data lines with a second lighting test signal and a reference signal by controlling a second circuit part and controlling an output impedance of a driving integrated circuit. Therefore, the method may perform a lighting test of a display panel in which the driving integrated circuit is mounted (e.g., a display module).

Figure 8:
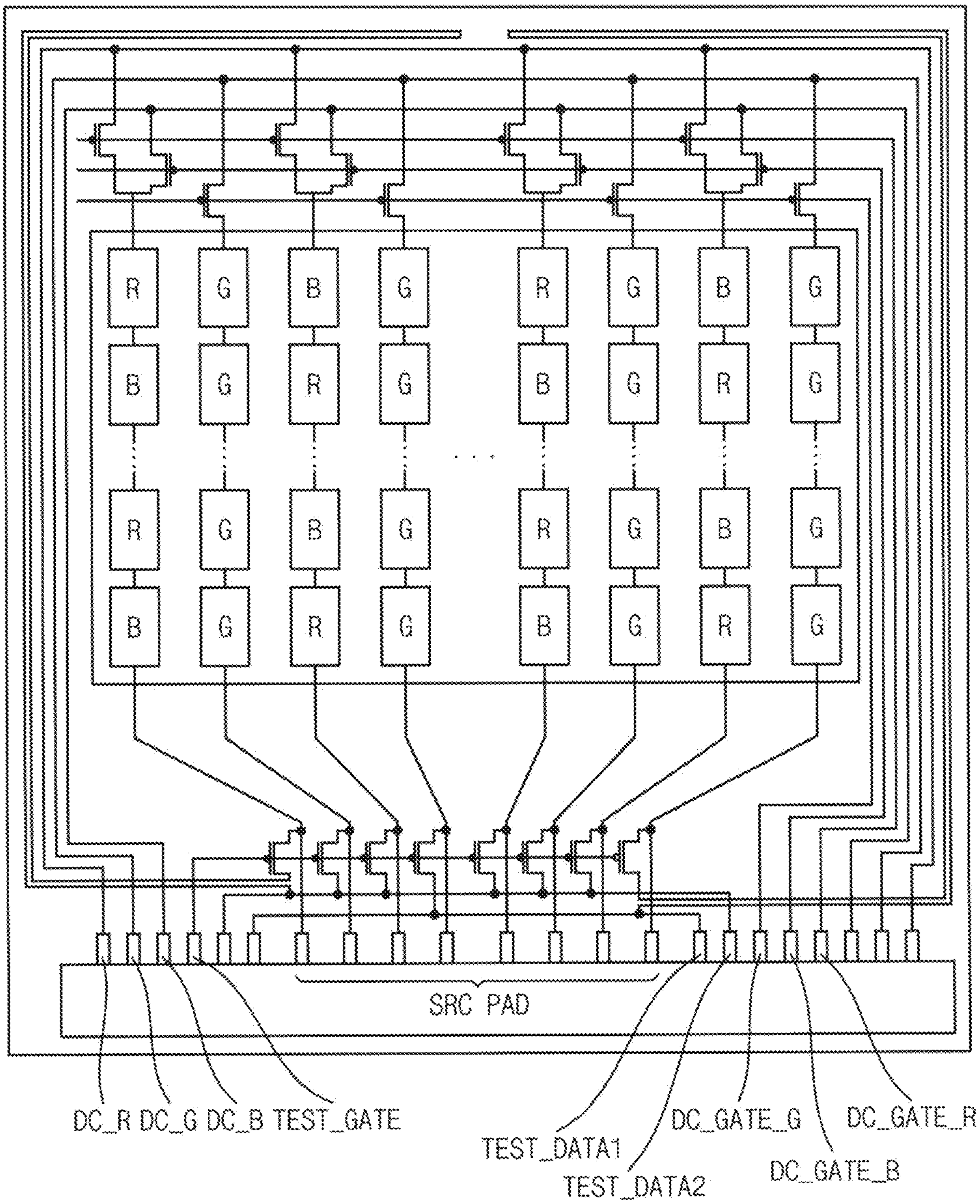
FIG. 8 is a circuit diagram illustrating an example of the display panel of FIG. 1.

FIG. 8 is a circuit diagram illustrating an example of the display panel of FIG. 1.

Referring to FIGS. 1 and 8, a display panel 100 may include a display part 110, a first test circuit part 120, a second test circuit part 140 and a pad part 150.

The display part 110 may include pixel columns arranged in a Pentile matrix.

The first test circuit part 120 may be supplied first lighting test signals DC_R, DC_G, and DC_B from the pad part via a first through third wirings. The first test circuit part 120 may include test transistors which electrically connect the first through third wirings and the pixel columns in response to first test control signals DC_R, DC_G, and DC_B.

The second test circuit part 140 may include transistors which transfer second lighting test signals TEST_DATA1 and TEST_DATA2 from the pad part 150 to data lines in response to the second test control signal DC_GATE.

In an example embodiment, the second test circuit part 140 may include a lighting test line extending through (or positioned at) at least a portion of a non-display part.

For example, the second test circuit part 140 may include a first lighting test line which extends through (or is positioned at) a left portion of the non-display part and an upper left corner of the non-display part. Here, the first lighting test line may be electrically connected to a data line in accordance with a first pixel column (e.g., R/B pixel column) in the left side of the display part 110. For example, the second test circuit part 140 may include a second lighting test line which extends through (or is positioned at) a right portion of a non-display part and an upper right corner of the non-display part. Here, the first lighting test line may be electrically connected to a data line in accordance with a second pixel column (e.g., G pixel column) in the right side of the display part 110. In some example embodiments, the first lighting test line and the second lighting test line may receive different lighting test signals (e.g., TEST_DATA1 and TEST_DATA2).

In the display panel of FIG. 8, a lighting test of the display panel 100 may be carried out using a first test circuit part 120 and a second test circuit part 140 under a condition in which the driving integrated circuit is not mounted in the display panel 100. A lighting test of the display panel 100 may be carried out using a first test circuit part 120 and a driving integrated circuit under a condition in which the driving integrated circuit is mounted in the display panel 100. That is, a lighting test may be carried out using a reference signal supplied from a driving integrated circuit and a lighting test signal supplied through a first test circuit part 120 under a condition in which the driving integrated circuit is mounted in the display panel 100.

According to some embodiments, a method of testing a display panel for detecting cracks may perform in a display panel including a display part including pixel columns electrically connected to data lines, and a non-display part positioned adjacent to the display part. The method of testing a display panel may include supplying a first lighting test signal passing through at least a portion of the non-display part to a first test circuit part that transfers the first lighting test signal to the data lines, transferring a reference signal being supplied from a driving integrated circuit to the data lines using a switching part, and transferring the first lighting test signal to the data lines using the first test circuit part.

Figure 9:
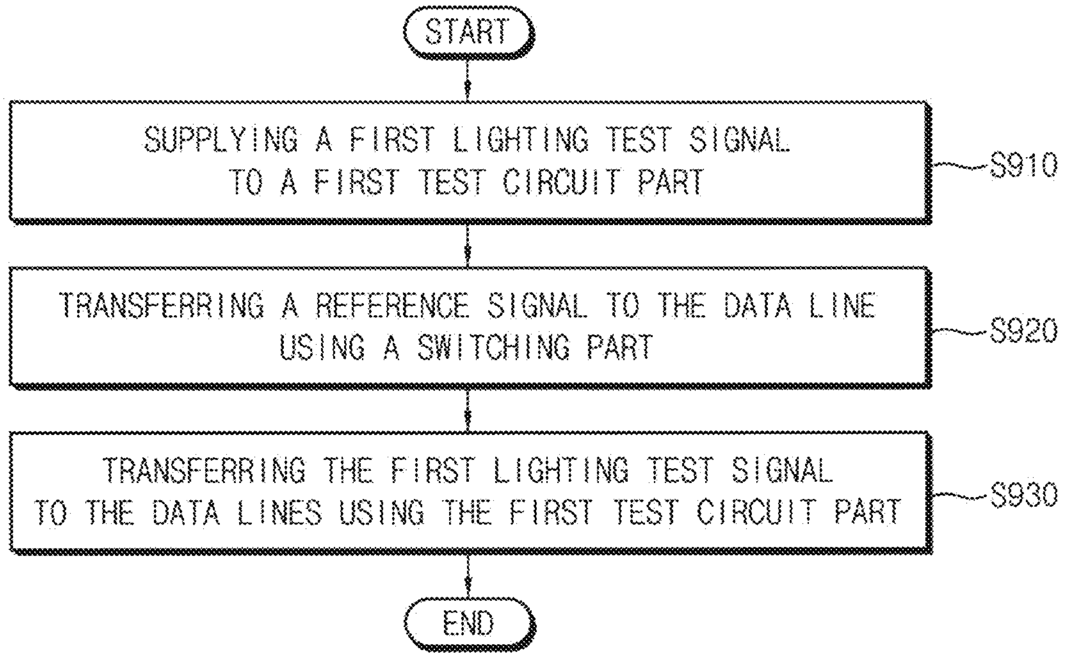
FIG. 9 is a flow chart illustrating a method of testing a display panel of FIG. 1.

FIG. 9 is a flow chart illustrating a method of testing a display panel of FIG. 1.

Referring FIGS. 1 and 9, the method of testing a display panel 100 may include supplying a first lighting test signal passing through at least a portion of the non-display part to a first test circuit part that transfers the first lighting test signal to the data lines (Operation S910), transferring a reference signal being supplied from a driving integrated circuit to the data lines using a switching part (Operation S920), and transferring the first lighting test signal to the data lines using the first test circuit part (Operation S930).

In an example embodiment, the supplying the first test circuit part with the first lighting test signal may include controlling a second test circuit part to be in an off state. The second test circuit part is electrically connected to the switching part in parallel and configured to supply the data lines with a second lighting test signal passing through at least the portion of the non-display part.

In an example embodiment, the transferring the first lighting test signal may include supplying the first test circuit part with a first test control signal, and transferring the first lighting test signal to the data lines in response to the first test control signal.

The present embodiments may be applied to any display device having a display panel. For example, the present invention may be applied to an organic light emitting display device and a liquid crystal display device, or it may be applied to a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and aspects of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display panel comprising:

a display comprising pixel columns electrically connected to data lines;

a non-display area adjacent the display;

a test circuit configured to receive a lighting test signal passing through a lighting test line that is electrically coupled to a single pixel column of the pixel columns and configured to apply the lighting test signal to the single pixel column in response to a test control signal, wherein the lighting test line extends along the display through at least a portion of the non-display area;

a switch configured to receive a data signal from an external component, and to transfer the data signal to the data lines in response to a switching signal;

a second test circuit electrically connected to the switch in parallel and configured to supply a second lighting test signal to the data lines in response to a second test control signal; and a driving integrated circuit configured to generate the test control signal, the second test control signal, and the switching signal, and to supply a reference signal to the switch, wherein the driving integrated circuit is configured to control the second test circuit to be in an off state using the second lighting test signal, the driving integrated circuit is configured to control the test circuit to supply the lighting test signal to the data lines during a first period using the test control signal, and the driving integrated circuit is configured to control the switch to supply a reference voltage to the data lines during a second period that is different from the first period using the switching signal.

2. The display panel of claim 1, wherein a damage in at least the portion of the non-display area is detected based on a resistance variation of the lighting test line.

3. The display panel of claim 1, further comprising:

a scan driver configured to control the pixel columns to receive the reference voltage from the data lines during the second period.

4. The display panel of claim 1, wherein the second test circuit comprises a second lighting test line extending through at least the portion of the non-display area.

5. The display panel of claim 1, wherein the switch comprises a switching transistor configured to transfer the data signal to the data lines in response to the switching signal.

6. The display panel of claim 1, wherein the switch is implemented in the driving integrated circuit.

7. The display panel of claim 1, wherein the second lighting test signal is a pre-lighting test signal, and the second test control signal is a pre-test control signal.

8. The display panel of claim 1, wherein the lighting test line is electrically connected to one pixel column at an outermost of the display from among the pixel columns.

9. The display panel of claim 8, wherein the display comprises:

a first pixel column in which a first pixel to emit a first color light and a second pixel to emit a second color light are alternately arranged;

a second pixel column in which the first pixel and the second pixel are alternately arranged in reverse order of the first pixel column; and a third pixel column in which a third pixel to emit a third color light is arranged, wherein the lighting test line is electrically connected to the third pixel column.

10. The display panel of claim 9, wherein the display further comprises:

a fourth pixel column in which the third pixel is arranged, the fourth pixel column being electrically connected to the test circuit via a resistor having a resistance that is equal to a resistance of the lighting test line.

* * * * *